Figure 1:
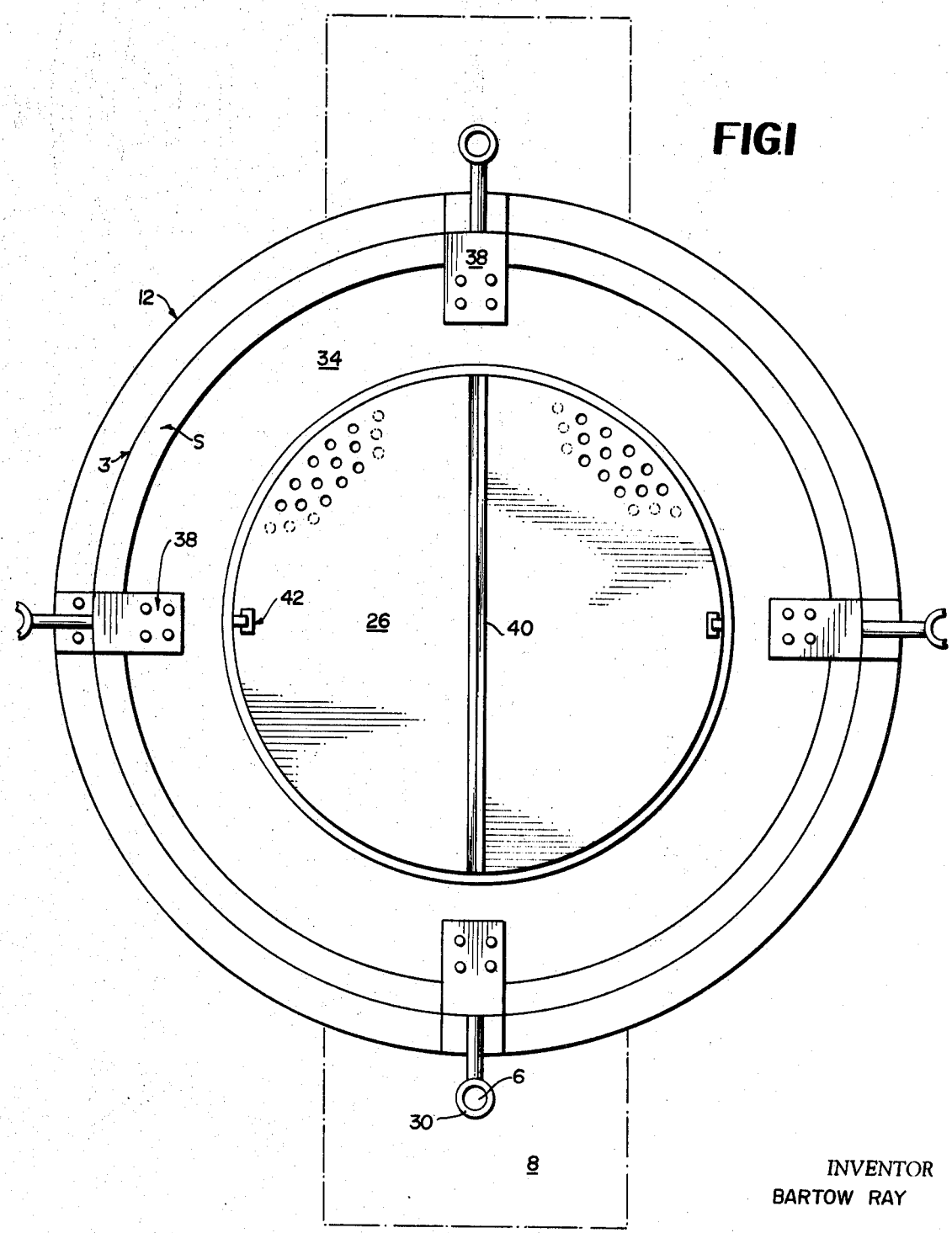

United States Patent

[11] 3,568,836

[72] Inventor Bartow Ray
 McLean, Va.
[21] Appl. No. 811,411
[22] Filed Mar. 28, 1969
[45] Patented Mar. 9, 1971
[73] Assignee Future Products Development Corporation
 McLean, La.

[54] SEWAGE TREATMENT UNIT
 7 Claims, 2 Drawing Figs.
[52] U.S. Cl. ................................................ 210/86,
 210/121, 210/242, 210/250
[51] Int. Cl. ............................................... B01d 21/14
[50] Field of Search........................................... 210/86,
 246, 242, 121, 250

[56] References Cited
 UNITED STATES PATENTS
| | | | |
|---|---|---|---|
| 1,808,279 | 6/1931 | Anderson.................... | 210/242 |
| 2,202,772 | 5/1940 | Durdin, Jr. .................. | 210/242X |
| 3,332,552 | 7/1967 | Zabel........................... | 210/86 |
| 3,355,020 | 11/1967 | Parks et al. .................. | 210/121 |

Primary Examiner—John Adee
Attorney—Flumley, Tyner & Sandt

ABSTRACT: A unit for collecting floating solids from sewage ponds comprising a frame with a vertically slideable float and collection bin therein and a guide means, all positioned above a sewage inlet to trap solids in the collection bin. The added buoyancy raises the float out of the water when the bin is filled.

SEWAGE TREATMENT UNIT

This invention relates to sewage disposal units, more particularly to units used to collect solid materials in a sewage pond.

The area to which this invention is directed, may generally be termed sewage disposal and more specifically activated sludge oxidation process of sewage disposal. In these latter processes, bacteria convert organic material in the sewage into liquids and gases which are further purified by evaporation, further bacterial decomposition, filtering, etc. As can be appreciated, raw sewage is generally a liquid medium containing solid matter, such as rags, paper, foil, etc. The organic materials can be decomposed by bacterial action, however, solids such as wood, certain papers and rags, rubber, plastics, and metals which will be present do require an initial operation to separate the solid materials from the organic decomposable materials. A few solid materials will float to the surface upon entering the oxidation pond or cell. After becoming waterlogged, these materials sink to the oxidation layer at the bottom of the cell, where anaerobic bacteria are actively decomposing the sewage. Since these materials are hard to digest, they slow the overall process and it is desirable to remove the materials when they initially enter the oxidation cell and rise to the surface. The normal practice of removal, is to periodically skim the surface of a cell and collect the floating solids. When manual labor is involved, it is apparent that a considerable amount of effort and expense is added to the sewage disposal process. In the case of sewage ponds as opposed to sewage treatment tanks, manual removal has been the only feasible method of collecting floating solids. Certain devices have been devised for use in sewage treatment tanks, that is, relatively small filterlike tanks through which the sewage is passed prior to entry into a pond.

Means of solid separation have been used and have included such devices as a simple perforated bin through which the sewage is passed in order to allow the liquid to drain through while retaining solids. This device will accumulate solids which would not necessarily need to be removed, since they could be digested in the oxidation pond. By collecting these materials, the problem of disposal of the solids is increased and the number of times which the collectors must be emptied is considerably increased. It is therefore not desirable to pass the sewage through a solids collecting bin prior to entry into the pond, since this merely complicates the problem by separating some digestible material along with the nondigestible materials.

Tanks for sewage treatment generally provide some system for collecting solids and such systems are exemplified by U.S. Pat. Nos. 2,095,394 and 3,355,020. These devices show sewage treatment tanks wherein floating scum collectors are provided which can be vertically adjusted with the water level in the tank. These devices are expensive and do not provide complete oxidation treatment of the sewage, so that the liquid expelled from the tanks must eventually be passed to an oxidation pond. These devices, further, are complicated and subject to mechanical failure, since they provide a chain which moves solids across the water level to a baffle where they are mechanically picked up. The only advantage to such devices is that they will not remove as much digestible solids as does the perforated collector bin referred to above. These devices, however, do not provide collector bins which are vertically adjustable, and as can be seen, the means for raising and lowering the skimmer as the water level raises is awkward and not dependable.

In view of the ever increasing amount of sewage and the tremendous increase in volume fed to existing sewage systems, it is necessary to provide a continuously operating disposal system which will remove nondigestible materials, thereby speeding up the overall digestion process, but will not remove digestible solids.

In order to provide an improved solids collector for a sewage disposal system, it is the primary object of the present invention to provide a vertically adjustable floating means for collecting and retaining solids therein.

Another object is to provide a device of the subject character which is provided with stabilizing means.

Still another object is to provide the subject device having means to indicate when the collector is filled.

Another object of this invention is to provide a solids collector for oxidation ponds which is thoroughly vented and which will promote digestion of any digestible materials collected in the bin.

These and other objects of the invention are achieved by the provision of a frame with a vertically slideable float and collector bin therein and a guide means arranged above a sewage outlet to direct solids into the collector bin, the float and funnel are stably but adjustably positioned on the frame for vertical movement with the water level and for allowing a filled bin to rise to the water level for emptying.

Figure 2:
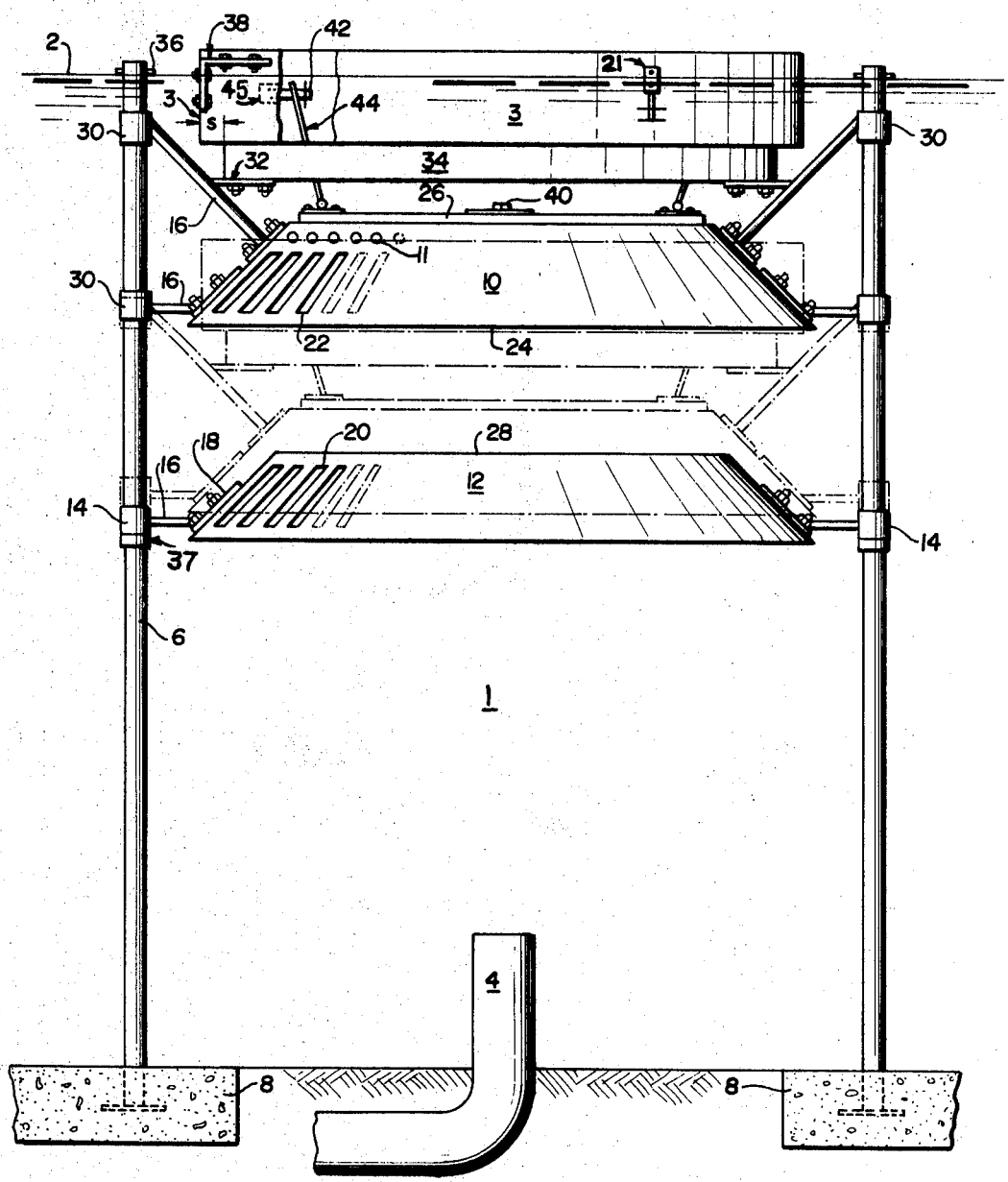

The invention may be better understood if reference is made to the FIG., wherein:

FIG. 1 is a top view of the solids collector unit of FIG. 2; and
FIG. 2 is a side view showing the solids collector in full lines at its high water level and in dotted lines at the low water level.

Referring more specifically to FIG. 2, the solids collector is seen to rest in a sewage medium 1, having an upper level 2, and is positioned above a sewage inlet 4. The sewage inlet 4 may be connected with any sewage-collecting system such as are conventionally used in cities and in facilities having sewage treatment systems. The unit of this invention rests on a frame comprising vertical posts 6 embedded in concrete or other stabilizing blocks 8 at the bottom of the pond. The posts 6 should be securely embedded and should be of a height sufficient to extend above the liquid level at its highest point. On the posts 6, a securely fixed funnellike element 12 is attached by means of links 16 and brackets 14 to the support posts 6. The means of attaching the brackets 14 to the posts may be welding or other attachments and while bolts 18 have been shown between links 16 and funnel 12, welding and other securing means are contemplated. The funnel 12 is a hollow element open at each end which contains vents 20 which allow liquid material to flow therethrough but retains solids so that guide 12 directs solids upwardly into the collector bin 10.

Collector bin 10 is shaped like an inverted bowl and has vents 22 and holes 11 to allow liquids and gases to circulate therethrough. The entrance 24 is open; however, the top 26 is closed in distinction to the top 28 of funnel 12 which is open. The bin 10 is attached by links 16 to brackets 30 contained on frame posts 6 and, additionally, by means of ancillary brackets 32 a float 34 is securely attached to the collector bin 10. The brackets 30 are adapted to slide within limits in a vertical direction on posts 6. This is achieved by conventional bearings between brackets 30 and posts 6, for example, by utilizing brackets (30) lined with Teflon. The limits of movement are established by upper stop element 36 extending above the water level and lower stop 37. The method of attachment of the collector bin 10 to the float 34 and to the posts 6 may be varied so long as the attachment allows vertical motion along a frame formed by posts 6.

The provision of the ventilation slots 22 and the holes 11 insures that adequate circulation of fluids will be achieved within the collector bin 10. In order to insure digestion of the digestible solids contained within the bin, it is necessary to circulate bacteria through its carrier liquid and to provide oxygen to enhance the digestion of the aerobic bacteria contained at the upper water level. These vents 22 and 11 thereby insure that only the nondigestible solids will be removed from the treatment pond. Since the opening 24 leading into the collector bin is unobstructed, any materials within the bin which, by reason of their partial digestion, settle back to the pond will not be removed and the consequent problem of eliminating solid waste is overcome. By settling to the bottom of the pond, the anerobic bacteria can continue and ultimately digest those materials. When the bin is filled, the float indicator 21 will be out of the water and the solids can be removed by opening doors 26 on the top of the collector bin 10, which will be slightly under the water level. The doors are accessible by reason of the cylindrical nature of the float 34. The doors 26 are hinged at 40. In order to open the doors, it is necessary to remove lock pin 42, for example, by pulling it out of its recess 45 on the inner periphery of the float 34, and when this is done the pin 42 may be pulled upwardly, which simultaneously raises opening handle 44 and pulls the doors 26 open. Since the materials are floatable, they will rise to the surface of the water and may be easily collected by reaching through the cylindrical float element. The cylindrical float element will further retain the solids and prevent their initial rush out of the collector bin which would scatter them over the surface of the water.

The float 34 comprises a buoyant material, for example, a foam plastic material, and can be shaped as a hollow, tubular element of plastic, metal, wood, etc., which will float on the liquid level 2. As can be seen from the drawings, the position of the float 34 determines the position of collector bin 10, since they are securely connected by brackets 32. A gauge 21 is provided on the float to indicate when the bin should be cleaned out. When the collector bin 10 is filled with solid materials, the additional buoyancy will push the float higher in the water until the gauge 21 is exposed to visual observation, indicating that the unit should be cleaned. Additional features of the float include provision of wave shield 3 which adds stability to the unit. The wave shield 3 comprises a cylindrical element securely fastened to the concentrically housed float 34 by means of brackets 38. A small space, S in FIG. 1, provides a calm channel in which the float may operate without being disturbed by wave actions. As can be appreciated, waves will buffet shield 3 while the float 34 will be subjected only to the relatively calm waters in the space S. This enables the unit to operate on a more stable basis and prevents misdirection of the incoming solids through funnel 12. Even in an area having relatively calm climatic conditions, it can be appreciated that winds can cause waves on a pond, which waves can be sufficient to misalign the collector bin 10 and the guide means 12. Therefore, provision of the wave shield 3 insures adequate operation of this invention. It additionally insures that the cleanout indicator 21 will remain below water until the bin is actually filled.

Referring to FIG. 1, a top view of the collector unit is seen wherein the float 34 is seen to enclose the doors 26 hinged at 40. The door locks 42 are easily accessible. Additional vent holes 11 are provided in doors 26 to further insure adequate digestion through circulation of fluids. Brackets 38 attach the float 34 to the wave shield 3. The outer periphery of the funnel 12 may also be seen in the top view, as well as the supporting blocks 8, the posts 6 and the sliding brackets 30.

Referring again to FIG. 1, the vertical adjustment by reason of variations in water level is seen to be affected by movement of the brackets 30 along posts 6. This movement is initiated by the float 34 which seeks the water level in the pond. This must be provided since the capacity of a sewage disposal system varies with the input from the city, town, or other installation which is being served. Naturally, the sewage treatment is relatively low in the night hours and early morning hours and rises periodically during the course of a day. Additionally, variations in capacity will occur with seasons, days of the week, etc. Therefore, if the device were a static unit which would not seek the water level, it could be ineffective to collect solids when, for example, a low water level is experienced wherein the liquid level is below the collector bin 10. Therefore, the vertical adjustment is seen to further adapt the unit for use in conventional oxidation ponds.

Since each oxidation pond normally has only one inlet, only one collector unit need be provided in each oxidation pond. An oxidation pond generally covers a surface area of approximately one acre. It should be understood that variations in the size of the oxidation pond or in the number of inlets would require corresponding variations in the number of units of this invention which are required.

The materials of construction and size of the unit will depend upon the above-noted variables, such as capacity, etc. Generally, the materials of construction of units adapted for use in sewage operations must be oxidation resistant materials, such as steel or copper. However, plastic and other noncorrosive materials could be used, provided they are structurally sound. It should, additionally, be apparent that the size of the unit is not a limitation on the invention; however, generally speaking, the unit will be set in a liquid which can vary from approximately a 4 foot depth to a 6 foot depth. Accordingly, the posts 6 should be approximately 6 to 7 feet long and the diameter of the collector bin, the funnel and the float would be on the order of 5 to 6 feet. Again, this will vary with the expected amount of solids to be derived from a given location. With such an arrangement, the space between the wave shield and the float would be on the order of three inches and the space for vertical adjustment along the posts would be on the order of 2 feet. The guide 12 would be set approximately 3 feet above the inlet. These figures are merely illustrative and adapted for use in a unit which is used in a one acre oxidation pond.

As can be seen, this invention provides an automatically adjusting device which will collect solids and differentiate between the oxidizable solids which are returned to the liquid and the nonoxidizable solids which are retained and removed, thereby speeding the overall digestion process.

The indicator or gauge 21 can be any visible indicating means, such as a line painted around the wave shield 3, or can be a vertically positioned sight glass.

Having described the invention, what is desired to be protected is described in the appended claims.

I claim:

1. A solids collector adapted for use in sewage treatment plants, comprising a frame positioned over and around an inlet, a solids guide means on said frame, a vertically adjustable collector means positioned above said guide and float means securely attached to said collector means, wherein said guide is separate from said collector and is positioned between said inlet and said collector.

2. The unit of claim 1 wherein the collector means is provided with slideable brackets secured to vertical posts in the frame to effect vertical movement.

3. The unit of claim 1 wherein the float is a tubular element positioned above the collector means.

4. The unit of claim 3 wherein the float is provided with indicator means which rises above the liquid level when the collector means if filled.

5. The unit of claim 1 wherein the collector means is vented.

6. The unit of claim 1 wherein the guide means is vented.

7. The unit of claim 1 wherein the collector means is provided with circular hatch doors on its upper surface.